United States Patent [19]

Umeda

[11] Patent Number: 4,652,948

[45] Date of Patent: Mar. 24, 1987

[54] AUTOMATIC TAPE LOADING TYPE RECORDING AND/OR REPRODUCING APPARATUS

[75] Inventor: Hiroyuki Umeda, Yokohama, Japan

[73] Assignee: Victor Company of Japan, Ltd., Japan

[21] Appl. No.: 596,294

[22] Filed: Apr. 3, 1984

[30] Foreign Application Priority Data

Apr. 8, 1983 [JP] Japan ................................. 58-61895
Apr. 8, 1983 [JP] Japan ................................. 58-61897

[51] Int. Cl.⁴ ...................... G11B 15/66; G11B 5/127
[52] U.S. Cl. ........................................ 360/95; 360/85; 360/118
[58] Field of Search .................... 360/95, 84, 85, 105

[56] References Cited

U.S. PATENT DOCUMENTS

| | | | |
|---|---|---|---|
| 3,939,491 | 2/1976 | Shigeta | 360/85 |
| 3,969,766 | 7/1976 | Tanaka et al. | 360/85 |
| 4,445,154 | 4/1984 | Kihara et al. | 360/85 |
| 4,517,613 | 5/1985 | Shibaike et al. | 360/85 |

FOREIGN PATENT DOCUMENTS

| | | |
|---|---|---|
| 2719768 | 11/1977 | Fed. Rep. of Germany . |
| 57-109160 | 7/1982 | Japan ................................. 360/85 |
| 1340455 | 12/1973 | United Kingdom . |
| 1462827 | 1/1977 | United Kingdom . |

Primary Examiner—John H. Wolff
Assistant Examiner—Matthew J. Bussan
Attorney, Agent, or Firm—Andrus, Sceales, Starke & Sawall

[57] ABSTRACT

An automatic tape loading type recording and/or reproducing apparatus comprises a guide drum having one or a plurality of recording and/or reproducing heads for recording and/or reproducing a signal on and/or from a tape, first and second loading members which relatively enter within a tape cassette which is loaded into the apparatus, a first loading mechanism for moving the first loading member over a short distance so as to draw the tape out of the loaded tape cassette and wrap the tape around a peripheral surface of the guide drum, a second loading mechanism comprising a rotatable loading ring mechanism which is disposed to encircle the guide drum, for moving the second loading member along the peripheral surface of the guide drum in a direction opposite to the moving direction of the first loading member so as to draw the tape out of the loaded tape cassette and wrap the tape around the peripheral surface of the guide drum, and a control mechanism for controlling an operating timing of the first loading member so that the tape wrapping operation of the first loading member is completed in an initial operating stage of the second loading member.

6 Claims, 14 Drawing Figures

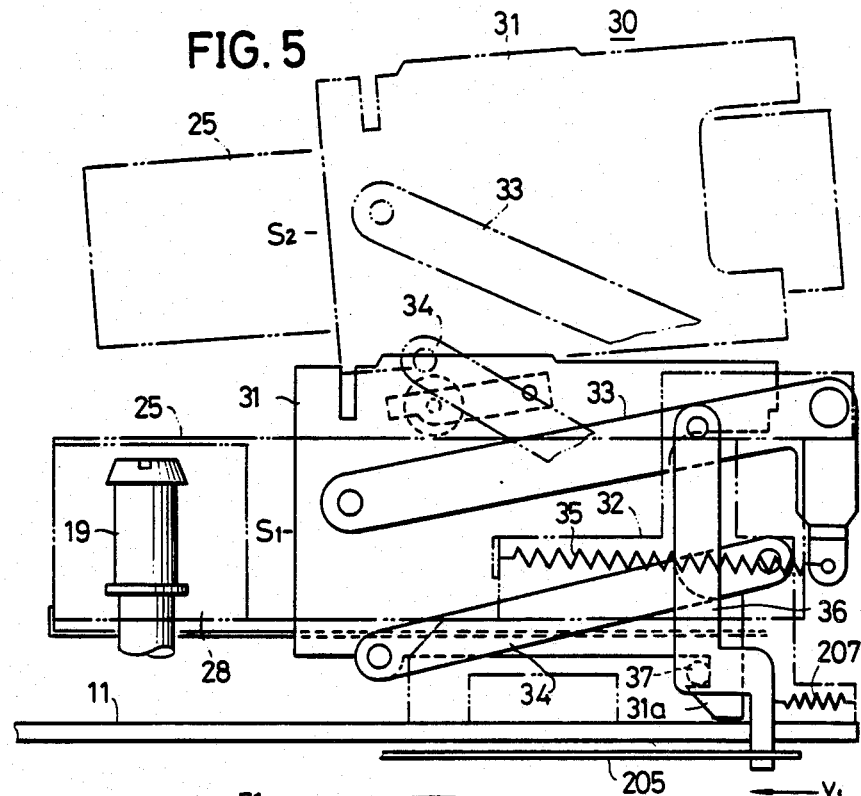
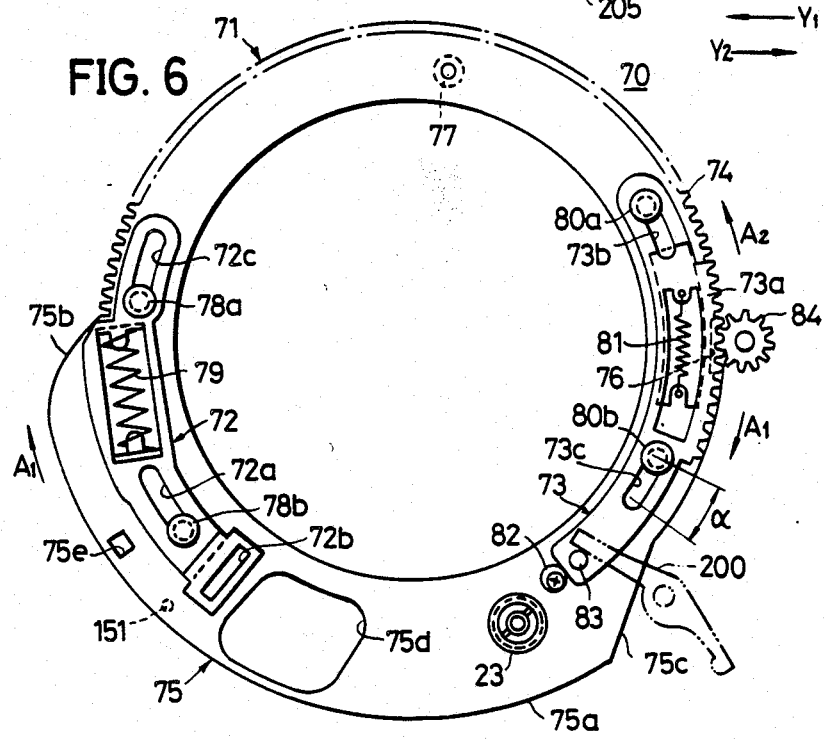

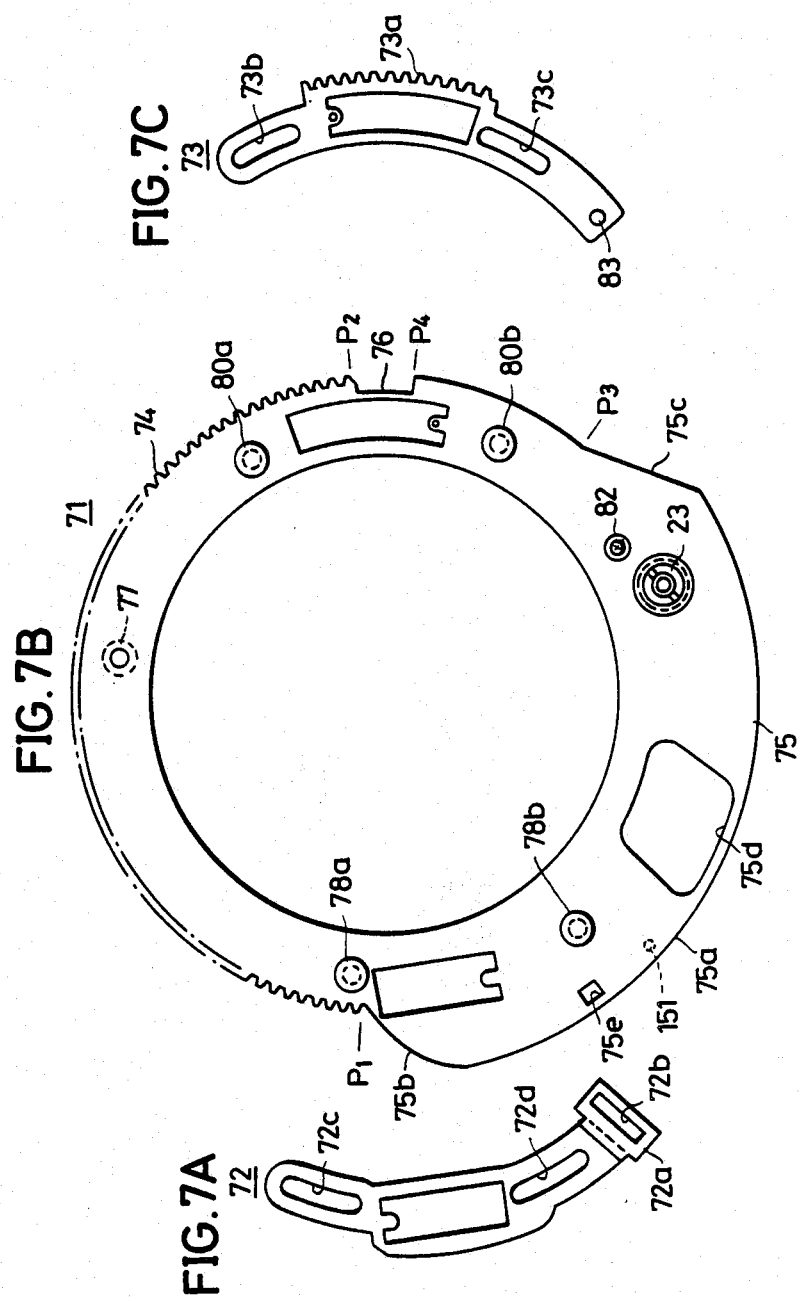

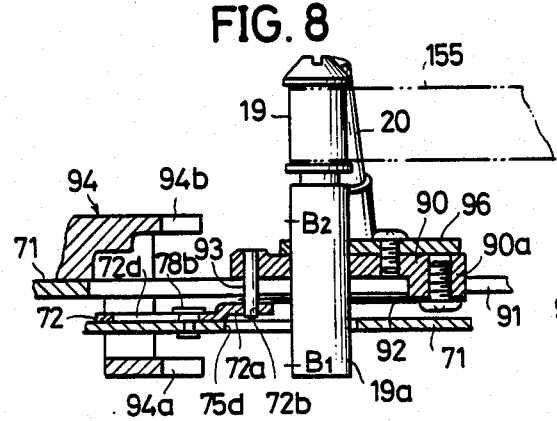
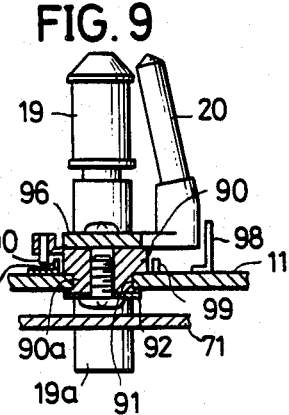
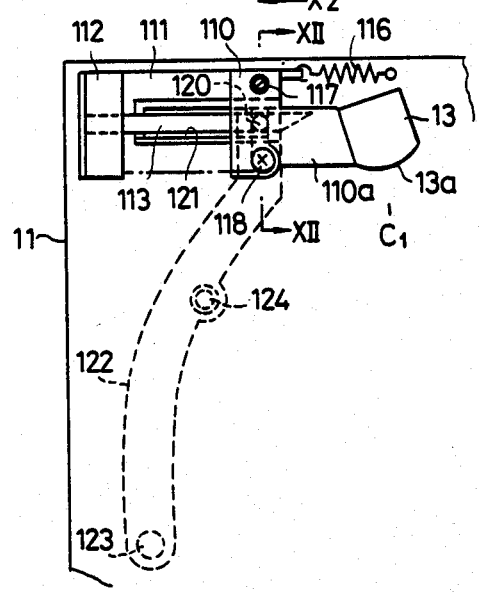
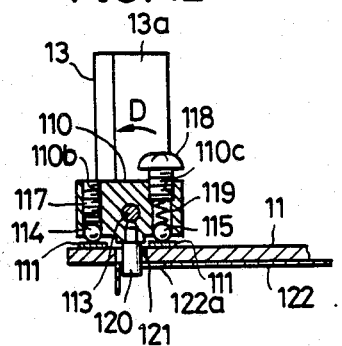
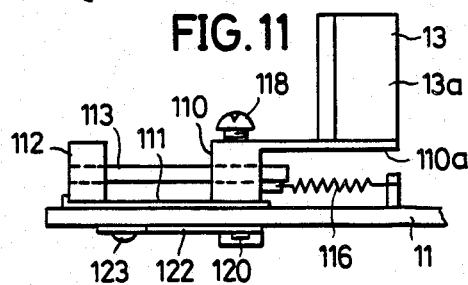

AUTOMATIC TAPE LOADING TYPE RECORDING AND/OR REPRODUCING APPARATUS

BACKGROUND OF THE INVENTION

The present invention generally relates to automatic tape loading type recording and/or reproducing apparatuses, and more particularly to an automatic tape loading type recording and/or reproducing apparatus which carries out a recording and/or a reproduction in a state where a tape has been drawn out of a tape cassette and wrapped around a peripheral surface of a guide drum which is provided with one or a plurality of heads.

Recently, recording and/or reproducing apparatuses have become popular. In such a recording and/or reproducing apparatus, a tape is drawn out of a tape cassette which is loaded into the recording and/or reproducing apparatus, and the drawn out tape is then loaded in a predetermined tape path. In this predetermined tape path, the tape makes contact with a peripheral surface of a guide drum which is provided with one or a plurality of heads. A signal is recorded onto and/or reproduced from the tape which is in the predetermined tape path. In the above recording and/or reproducing apparatus, the tape is loaded in the predetermined tape path automatically, and the apparatus is therefore referred to as an automatic tape loading tape recording and/or reproducing apparatus.

The conventional automatic tape loading type recording and/or reproducing apparatus was designed to drawn the tape out of the loaded tape cassette and to load the tape in the predetermined tape path, by moving a pair of loading poles which are respectively provided on the supply reel side and the take-up reel side, over approximately the same distance along both sides of the guide drum. In other words, the loading poles each performed one-half of the tape loading operation. Because the loading poles move over a relatively long distance, the loading poles were supported on respective first and second loading rings which encircle the guide drum. Thus, it was necessary to provide two loading rings, and this necessity for two loading rings became a problem when reducing the weight of the apparatus. In addition, since the two loading rings were arranged one on top of the other, this arrangement of the two loading rings became a problem when attempting to reduce the thickness or height of the apparatus. Further, the need to move the two loading poles to respective positions behind the guide drum with respect to the loaded tape cassette, became a problem when downsizing the apparatus.

SUMMARY OF THE INVENTION

Accordingly, it is a general object of the present invention to provide a novel and useful automatic tape loading type recording and/or reproducing apparatus in which the problems described heretofore have been eliminated.

Another and more specific object of the present invention is to provide an automatic tape loading type recording and/or reproducing apparatus which is designed so that a large part of a tape loading operation in which a tape is drawn out of a tape cassette and is loaded in a predetermined tape path in which the tape makes contact with a peripheral surface of a guide drum, is performed by a single loading ring which is disposed to encircle the guide drum, and a remaining part of the tape loading operation is performed by a rotary arm member. The operation of the rotary arm member is completed in an initial rotating stage of the loading ring. According to the apparatus of the present invention, it is possible to reduce the weight and thickness of the apparatus compared to the conventional apparatus which employs two loading rings which are arranged one on top of the other, because the apparatus according to the present invention only employs a single loading ring. In addition, an operation in which the tape is wrapped around the peripheral surface of the guide drum by the loading ring, is mainly performed in a state where an operation in which the rotary arm member draws the tape out of the tape cassette has been completed. A loading pole supported on the rotary arm which has completed the tape draw-out operation, acts so as to limit a deviation of the tape in a width direction thereof, which tape is drawn out of the tape cassette by the rotating loading ring. For this reason, the tape draw-out operation by the loading ring is performed without introducing a deviation of the tape in the width direction thereof. In a stage where the loading ring has completed a rotating movement, the tape is loaded in a predetermined height position with respect to the width direction of the tape, and the tape can start to move in the predetermined tape path immediately after the tape loading operation has been completed. In other words, the tape can start to move in the predetermined tape path immediately after the tape loading operation has been completed, without the need to first correct the position of the tape to the predetermined tape path after the tape loading operation has been completed.

Still another object of the present invention is to provide an automatic tape loading type recording and/or reproducing apparatus in which a full-width erasing head which makes contact with the tape in the predetermined tape path, recedes to a position so as not to interfere with a movement of a tape draw-out pole located on the loading ring during a tape unloading operation. The full-width erasing head is designed to move during the tape unloading operation in a direction which is tangential to a moving locus of the tape draw-out pole on the loading ring and is the same as a moving direction of the tape draw-out pole. According to the apparatus of the present invention, the full-width erasing head recedes by moving in a direction away from the tape draw-out pole. Hence, a distance over which the tape draw-out pole moves from an initial position up to a position opposing the receded full-width erasing head, is long. Therefore, even in a case where the full-width erasing head is disposed near a position the tape draw-out pole assumes at the time of a recording or reproducing mode of the apparatus, it is possible to cause the full-width erasing head to smoothly and positively recede to the position so as not to interfere with the movement of the tape draw-out pole during the tape unloading operation. This means that a distance along a tape path between the full-width erasing head and the guide drum can be set to a short distance. A waiting time between a time when the apparatus is operated to carry out an insert recording and a time when the apparatus actually starts to carry out the insert recording, can consequently be shortened. The insert recording mode is a mode in which the apparatus inserts and records a new information on a pre-recorded tape.

Other objects and further features of the present invention will be apparent from the following detailed description when read in conjunction with the accompanying drawings.

BRIEF DESCRIPTION OF THE DRAWINGS

FIG. 5 shows a tape cassette loading mechanism;

FIG. 6 is a plan view showing a loading ring mechanism in the apparatus shown in FIG. 1;

FIGS. 7A, 7B, and 7C are plan views respectively showing a loading pole traction plate, a loading ring, and a cassette ejecting plate which constitute the loading ring mechanism shown in FIG. 6 in correspondence with each other;

FIG. 8 is a cross sectional view along a line VIII—VIII in FIG. 1, showing a loading pole mechanism on the supply side in correspondence with a stopper member;

FIG. 9 is a cross sectional view along a line IX—IX in FIG. 1, showing the loading pole mechanism on the supply side in correspondence with a guide plate;

FIGS. 10 and 11 are a plan view and a front view respectively showing an erasing head moving mechanism; and FIG. 12 is a cross sectional view along a line XII—XII in FIG. 10.

DETAILED DESCRIPTION

Figure 1:
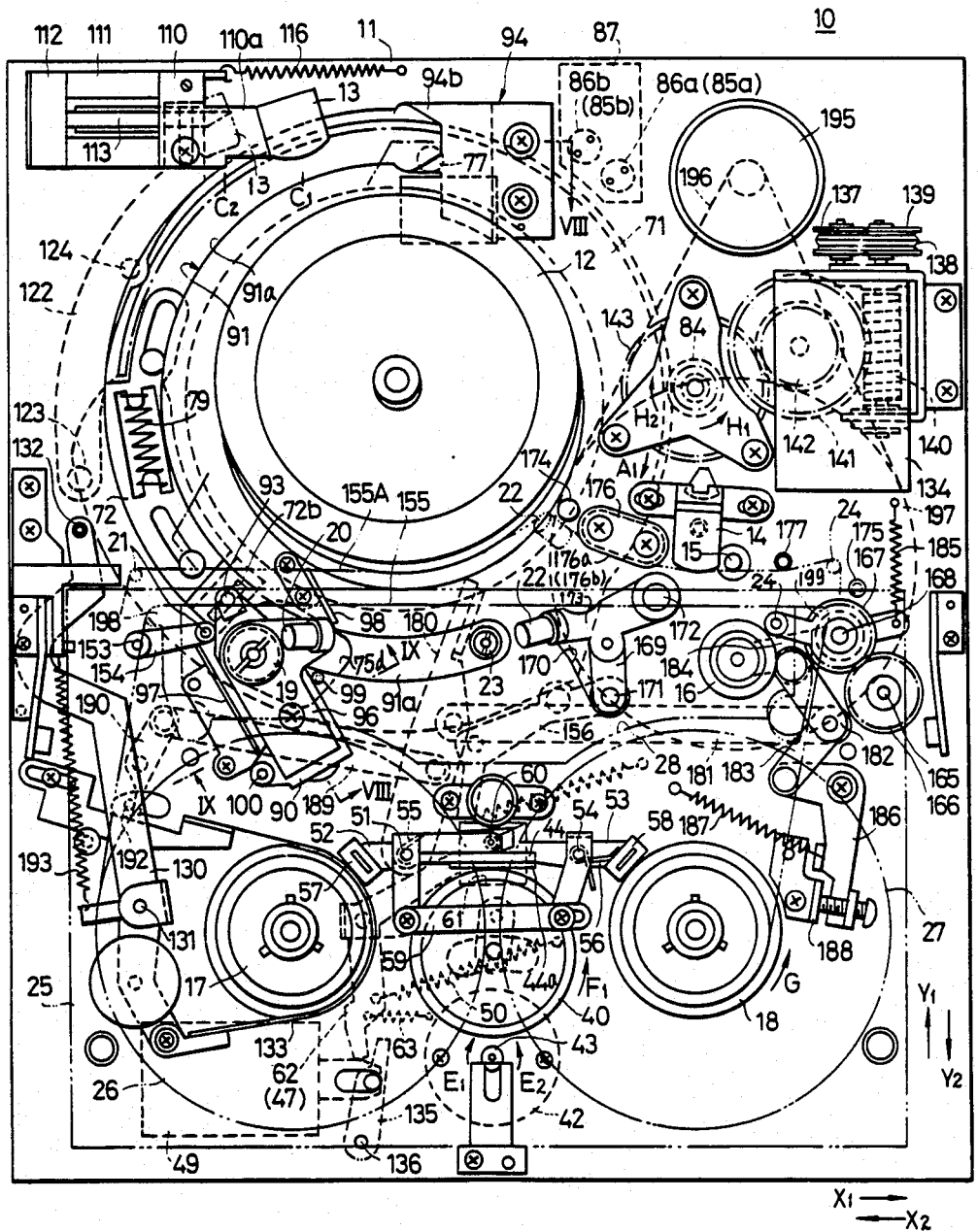
FIGS. 1 and 2 are plan views showing an embodiment of an automatic tape loading type recording and/or reproducing apparatus according to the present invention, in a stop mode and in a recording or reproducing mode thereof, respectively.
Figure 2:
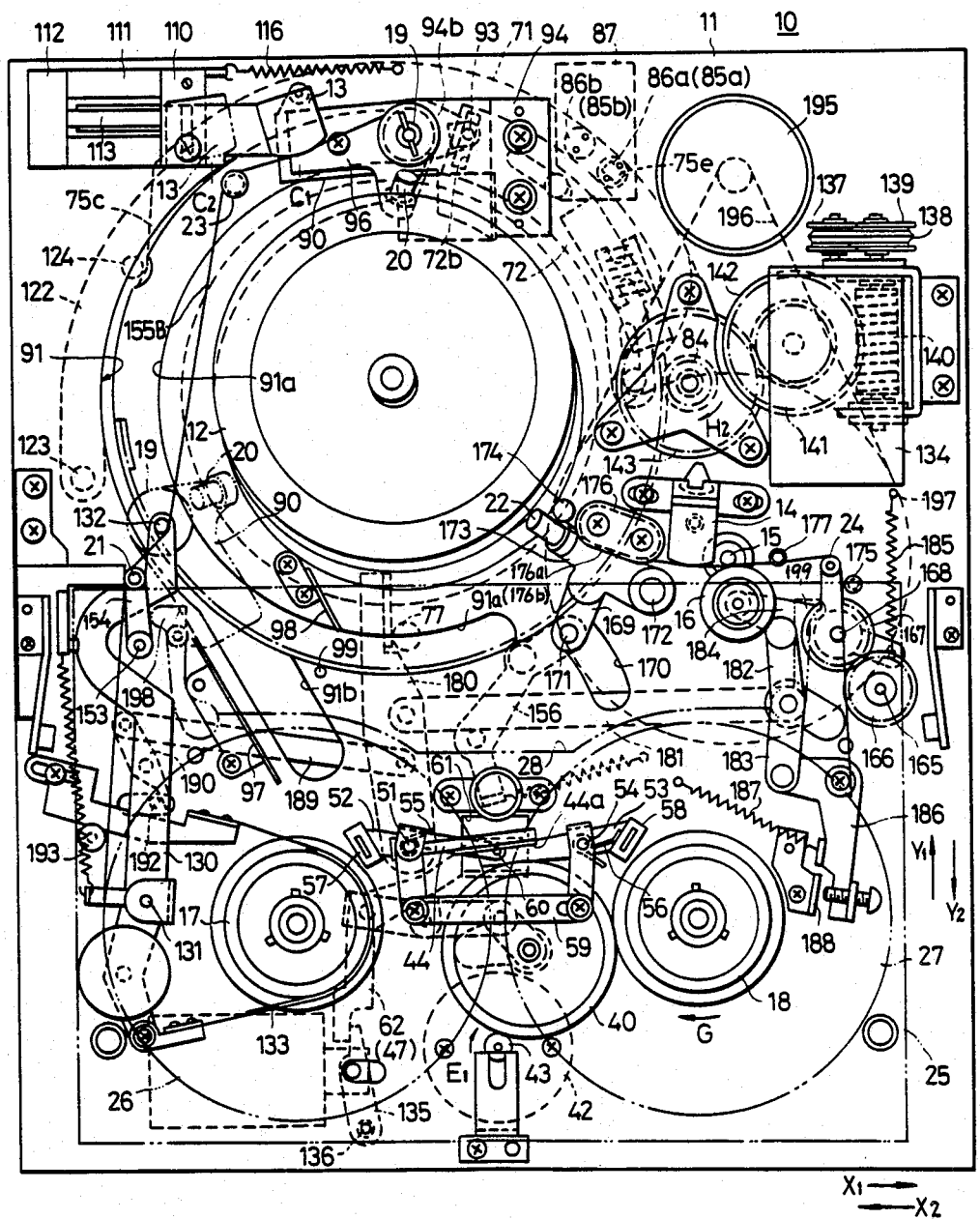

An automatic tape loading type recording and/or reproducing apparatus 10 is shown in FIGS. 1 and 2. As shown in FIGS. 1 and 2, the apparatus 10 comprises a chassis 11. A guide drum 12 which has one or a plurality of video heads, a full-width erasing head 13, an audio and control head 14, a capstan 15, a pinch roller 16, a supply reel disc 17, a take-up reel disc 18, and the like are located on the chassis 11. A vertical loading pole 19, a slant loading pole 20, and a vertical tape draw-out pole 21 are located in the left part of the apparatus 10. Further, a slant loading pole 22 and a tape guide pole 23 are located in the central part of the apparatus 10, and a vertical tape draw-out pole 24 is located in the right part of the apparatus 10.

A tape cassette 25 is loaded into a predetermined position in the apparatus 10, in a state where the tape cassette 25 is inserted within a housing 31 of a tape cassette loading mechanism 30 shown in FIG. 5. In this state, a supply reel 26 and a take-up reel 27 of the tape cassette 25, are fitted over the corresponding reel discs of the apparatus 10. In this loaded state of the tape cassette 25, the poles 19 through 24 and pinch roller 16 are inserted into an elongated opening 28 which is located at the front of the tape cassette 25.

As shown in FIG. 5, the housing 31 of the tape cassette loading mechanism 30, is supported on tip ends of support arms 33 and 34. These support arms 33 and 34 are pivotally supported on a bracket 32 (indicated by a two-dot chain line in FIG. 5) which is mounted on the chassis 11. The housing 31 moves vertically between a cassette loading position $S_1$ and a cassette ejecting position $S_2$, accompanying rotations of the support arms 33 and 34. The housing 31 is urged to assume the cassette ejecting position $S_2$ by a force exerted by a spring 35 which is stretched across the support arm 33 and the bracket 32. In the loaded state of the tape cassette 25, a claw part 31a of the housing 31 catches a pin 37 on a hanging arm 36 which is connected to the support arm 33, and the housing 31 is locked in the loading position $S_1$.

Figure 3:
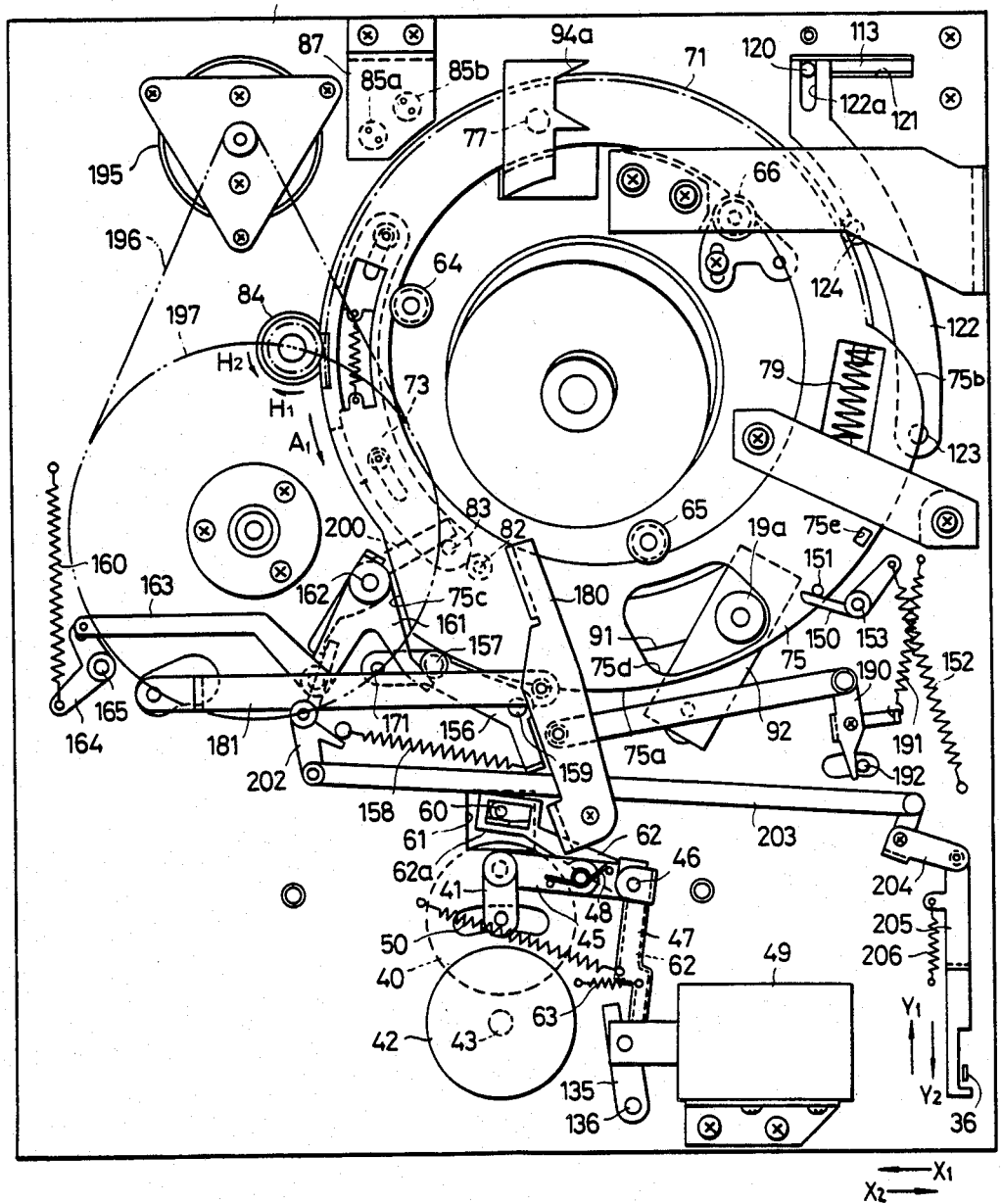
FIGS. 3 and 4 are bottom views respectively showing the apparatus shown in FIGS. 1 and 2 from the bottom of a chassis.

Next, description will be given with respect to mechanism related to an idler 40. As shown in FIGS. 1 and 3, the idler 40 is rotatably supported on a tip end of an arm 41 which is located on the lower surface of the chassis 11. This idler 40 is located on the upper surface of the chassis 11, and two diametrically opposite points on the idler 40 respectively oppose a motor shaft 43 of a reel driving motor 42 and a vertical wall 44a of a plate 44. The arm 41 is connected to a tip end of an arm 45, and a base end of the arm 45 is connected to an L-shaped idler pushing arm 47 which is pivotally supported by a pin 46 on the lower surface of the chassis 11. The arm 45 is rotatable with respect to the arm 47. The arm 45 is loaded with a spring 48 for applying a pushing force on the idler 40, so that the idler 40 pushes against the motor shaft 43. When a plunger 49 is OFF, the L-shaped arm 47 is rotated counterclockwise in FIG. 1 and clockwise in FIG. 3 by the action of a spring 50. In this state, the idler 40 moves in the direction of an arrow $Y_1$ and separates from the motor shaft 43, and lightly makes contact with the vertical wall 44a of the plate 44.

The plate 44 has an L-shape, and a bent part of this plate 44 and a supply reel disc brake lever 52 are commonly supported by a pin 51 which is located on the chassis 11. The plate 44 is urged to rotate clockwise by a force exerted by a spring 55. A take-up reel disc brake lever 53 has a substantially T-shape, and is supported by a pin 54 which is located on the chassis 11. The brake levers 52 and 53 are urged to rotate counterclockwise and clockwise in FIG. 1, respectively, by forces exerted by the respective springs 55 and 56. When the plunger 49 is OFF, brake shoes 57 and 58 push against the respective reel discs 17 and 18. An arm portion of the brake lever 53, extending in the direction of an arrow $Y_2$, and an arm portion of the plate 44, also extending in th direction of the arrow $Y_2$, are connected by a connecting plate 59 with a slight play therebetween.

A pin 60 is embedded at a tip end of an arm portion of the brake lever 52, which arm portion extends in the direction of an arrow $X_1$. The other brake lever 53 has an arm portion which extends in the direction of an arrow $X_2$ up to a position where this arm portion opposes the pin 60. The pin 60 passes through a hole 61 in the chassis 11, and reaches the lower surface of the chassis 11. The pin 60 is accordingly inserted into a rectangular frame part 62a located at a tip end of one arm portion of an L-shaped brake release arm 62 which is commonly supported by the pin 46 together with the arm 47. The other arm portion of the brake release arm 62 has the same shape as the arm 47 described before, and this other arm portion of the brake release arm 62 and the arm 47 lie one upon the other. When the plunger 49 is OFF, the brake release arm 62 is rotated counterclockwise in FIG. 1 and clockwise in FIG. 3, by the action of a spring 63.

Next, description will be given with respect to a loading ring mechanism by referring to FIGS. 6, 7A, 7B, and 7C.

As shown in FIGS. 6 and 7A through 7C, a loading ring mechanism 70 comprises a loading ring 71, and a loading pole traction plate 72 and a cassette ejecting plate 73 which are mounted on the loading ring 71.

The loading ring 71 is supported by support rollers 64, 65, and 66 which support three inner peripheral points of the loading ring 71 as shown in FIG. 3. Thus, the loading ring 71 is rotatably supported on the lower surface of the chassis 11 in parallel therewith. In the plan view, the loading ring 71 encircles the guide drum 12.

As shown in FIG. 7B, the loading ring 71 comprises a gear part 74 between outer peripheral points $P_1$ and $P_2$ thereof, a cam part 75 between outer peripheral points $P_3$ and $P_1$ thereof, and a cutout part 76 between outer peripheral points $P_2$ and $P_4$. The cam part 75 is flanged in the outer periphery of the loading ring 71, and is made up of an arcuate portion 75a, and sloping portions 75b and 75c formed at starting and terminal ends of the arcuate portion 75a. Further, a hole 75d through which the loading pole 19 penetrates, and a small window 75e are formed in the cam part 75. The window 75e is detected by optical detecting means which will be described later on in the specification, and determines the rotational position of the loading ring 71 at the time of a reproducing mode, for example. The tape guide pole 23 is embeddedly provided on the upper surface of the loading ring 71. In addition, a pin 77 which moves the pinch roller 16 and the like in a final stage of a tape loading operation, is embeddedly provided on the lower surface of the loading ring 71.

Figure 4:
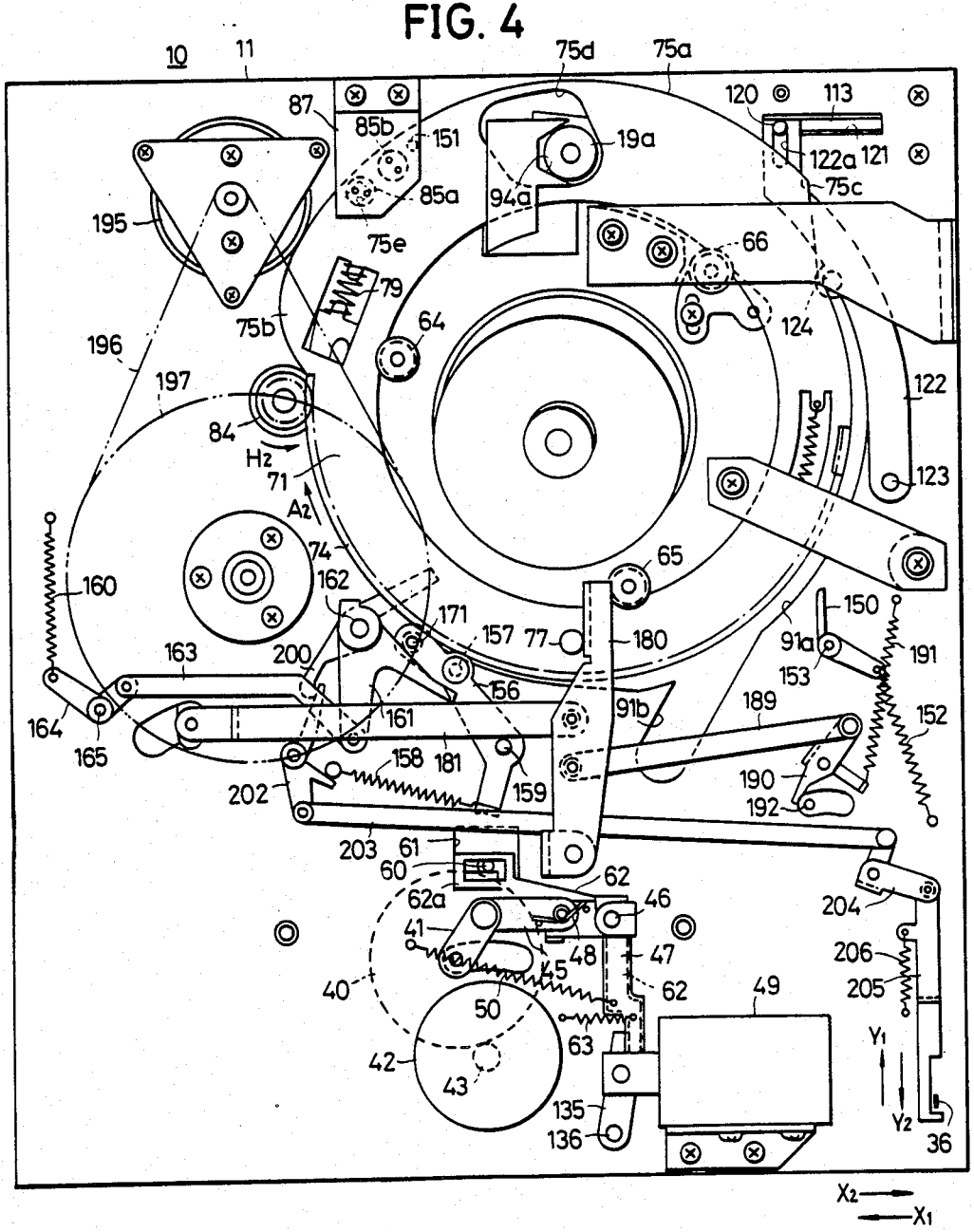

The loading pole traction plate 72 has a substantially arcuate shape as shown in FIG. 7A. The loading pole traction plate 72 steps upward at a lower part thereof in FIG. 7A, to form a step part 72a which is more clearly seen in FIG. 8. An elongated hole 72b is formed in the step part 72a. The loading pole traction plate 72 is mounted on the loading ring 71 in a state where a pair of arcuate elongated holes 72c and 72d of the loading pole traction plate 72 are fitted over corresponding pins 78 a and 78b on the loading ring 71, with a compressed coil spring 79 inserted between the loading ring 71 and the loading pole traction plate 72 are shown in FIG. 4. Because the coil spring 79 is inserted in its compressed state, the loading pole traction plate 72 is urged in the direction of an arrow $A_1$ by the action of the coil spring 79, and assumes a position deviated in the direction of the arrow $A_1$.

As shown in FIG. 7C, the cassette ejecting plate 73 has a substantially arcuate shape. A gear part 73a is formed in a predetermined section on the outer periphery of the cassette ejecting plate 73. Similarly as in the case of the loading pole traction plate 72 described before, the cassette ejecting plate 73 is mounted on the loading ring 71 in a state where a pair of arcuate elongated holes 73b and 73c of the cassette ejecting plate 73 are fitted over corresponding pins 80a and 80b on the loading ring 71. In this state, the cassette ejecting plate 73 is rotatable independently of the loading ring 71, over an angle α. As will be described later on in the specification, the cassette ejecting plate 73 rotates in the direction of an arrow $A_2$, independently of the loading ring 71, so as to carry pit a cassette ejecting operation. A coil spring 81 is stretched across the cassette ejecting plate 73 and a part of the loading ring 71, and the cassette ejecting plate 73 is urged in the direction of the arrow $A_1$ by the action of this coil spring 81. Thus, the cassette ejecting plate 73 assumes a position deviated in the direction of the arrow $A_1$. The position of the cassette ejecting plate 73 is adjusted by an eccentric pin 82 which is provided for adjusting and matching the teeth, so that the teeth of the gear part 73a coincides with the teeth of the gear part 74. The gear part 73a covers the cutout part 76, and extends from the cutout part 76 in the direction of the arrow $A_1$ over a predetermined angle. A pin 83 for rotating a ejecting, arm 200 which will be described later on in the specification, is embeddedly provided on the cassette ejecting plate 73.

In a stop mode of the apparatus 10, the loading ring mechanism 70 assumes a rotational position shown in FIGS. 1 and 3. In this state, a loading gear 84 opposes the cutout part 76 of the loading ring 71, and meshes with the gear part 73a of the cassette ejecting plate 73.

As shown in FIG. 2, a light emitting element 85a and a light receiving element 86a which constitute a first pair, and a light emitting element 85b and a light receiving element 86b which constitute a second pair, are respectively provided at positions so that the loading ring 71 is disposed between the light emitting elements and the light receiving elements. The light receiving elements 86a and 86b are mounted on the lower surface of the chassis 11, and the light emitting elements 85a and 85b are mounted on a bracket 87. As will be described later on in the specification, the light emitting element 85a and the light receiving element 86a detect the window 75e so as to detect the loading ring 71 rotates up to a position where the loading is completed. The light emitting element 85b and the light receiving element 86b also detect the window 75e so as to detect a rotational position of the loading ring 71 at the time of a pause mode and a search mode of the apparatus 10.

Next, description will be given with respect to the vertical loading pole 19 and mechanisms related thereto, by referring to FIGS. 8 and 9.

A loading pole support 90 is placed on the chassis 11, striding over a loading guide groove 91 which is formed on the chassis 11. A hanging part 90a at the rear end of the loading pole support 90, and a base part 19a of the loading pole 19 which is located at the front end of the loading pole support 90, are respectively guided by the guide groove 91. The loading pole support 90 slides under the guidance of the guide groove 91, in a state where the loading pole support 90 is prevented from separating from the guide groove 91 by a plate 92. This plate 92 is position on the lower surface of the chassis 11, and is fixedly screwed onto the loading pole support 90. A hanging pin 93 located at one end of the loading pole support 90, fits within the elongated hole 72b in the loading pole traction plate 72. The base part 19a of the loading pole 19 is fixed in a state where the base part 19a penetrates the loading pole support 90. A lower portion of the base part 19a penetrates through the hole 75d, and extends below the loading ring 71. A stopper member 94 restricts the position of the loading pole 19 when the tape loading operation is completed. A lower stopper 94a of the stopper member 94 stops a portion $B_1$ of the base part 19a which projects below the loading ring 71. An upper stopper 94b of the stopper member 94 is located at a height position so as to stop a portion $B_2$ of the base part 19a which projects above the loading ring 71.

A sub support 96 is fixedly screwed onto the loading pole support 90. The slant loading pole 20 is embeddedly provided on this sub support 96.

The loading guide groove 91 comprises an arcuate main guide groove part 91a, and a branching guide groove part 91b. Means is provided for causing the loading pole support 90 which is moving under the guidance of the main guide groove part 91a to enter within the branching guide groove part 91b shown in FIG. 2 during a tape unloading operation. This means is constituted by guide plates 97 and 98 and a guide pin 99 which are fixed on the chassis 11 shown in FIG. 1, and a pin 100 which is fixed and hanging from the loading pole support 90 and is guided by the guide plate 97. The guide plate 97 and the pin 100 constitute main guide means, and the guide plate 98 and the guide pin 99 constitute sub guide means.

In the stop mode of the apparatus 10, the loading pole support 90 is positioned within the branching guide groove part 91b as shown in FIG. 1, and assumes a clockwise rotated state. In this state, the loading poles 19 and 20 are arranged substantially parallel to the front of the tape cassette 25. In addition, the tape guide pole 23 on the loading ring 71 is positioned at the starting end of the main guide groove part 91a, and the poles 19, 20, and 23 are arranged on an imaginary line which is substantially parallel to the front of the tape cassette 25.

Next, description will be given with respect to the full-width erasing head 13 and peripheral parts thereof, by referring to FIGS. 10 through 12.

The full-width erasing head 13 is fixed on an arm part 110a which extends from a support base 110. The base part of the support base 110 is fixed on a base which is fixed on a forked base plate 111. The support base 110 extends in the direction of the arrow $X_1$, and is guided by a guide rod 113 which is inserted through the support base 110. Balls 114 and 115 slide over the base plate 111, and the support base 110 is movable in the directions of the arrows $X_1$ and $X_2$. In the stop mode of the apparatus 10, the support base 110 is moved in the direction of the arrow $X_1$ by a spring 116, and the full-width erasing head 13 assumes an operating position $C_1$ indicated in FIGS. 1 and 10.

As shown in FIG. 12, the ball 114 is fitted within a hole 110b of the support base 110, and a screw 117 adjusts the extent to which the ball 114 projects from the lower surface of the support base 110. The other ball 115 is fitted within a hole 110c of the support base 110. One end of a compressed coil spring 119 inside the hole 110c is fixed to a screw 118, and the ball 115 is urged to project from the hole 110c by the coil spring 119.

Accordingly, the ball 115 pushes against the base plate 111 due to the force exerted by the coil spring 119, and the support base 110 is urged in the direction of an arrow D about the guide rod 113 by the action of the coil spring 119. Further, the ball 114 also pushes against the base plate 111. Thus, even in a case where the precision of mounting of the guide rod 113 is poor, the support base 110 is urged in the direction of the arrow D by the action of the coil spring 119, and the balls 114 and 115 constantly push against the base plate 111. In other words, the support base 110 can move smoothly and stably without play, even up to a position where the movement thereof is completed.

The rotational position of the support base 110 in the direction of the arrow D, that is, the verticality of the full-width erasing head 13, can be varied by manipulating the screw 117. The verticality of the full-width erasing head 13 is adjusted at the operating position $C_1$ so that a tape contacting surface 13a of the full-width erasing head 13 is vertical to the chassis 11. As will be described later on in the specification, a rotational force in the direction of the arrow D acts on the full-width erasing head 13 when a magnetic tape moves while making contact with the tape contacting surface 13a. However, the rotation of the full-width erasing head 13 in the direction of the arrow D is restricted by the ball 114 which is stopped by the screw 117. For this reason, the full-width erasing head 13 will not be rotated in the direction of the arrow D by the action of the moving magnetic tape, and the full-width erasing head 13 is maintained in the vertical state even while the magnetic tape moves. Therefore, the magnetic tape makes contact with the tape contacting surface 13a of the full-width erasing head 13 in a normal manner, and the erasure of recorded signals can be carried out satisfactorily.

A pin 120 is embeddedly provided on the lower surface of the support base 110, in a state where the pin 120 fits within an elongated hole 121 in the chassis 11. The full-width erasing head 13 is restricted in the operational position $C_1$ in a state where the pin 120 is stopped by the end part of the elongated hole 121. The pin 120 is also fitted within an elongated hole 122a which is formed at one end of a rotary arm 122 located on the lower surface of the chassis 11, and the rotary arm 122 and the support base 110 are connected. The rotary arm 122 has a substantially arcuate shape, and the other end of the rotary arm 122 is pivotally supported by a pin 123. In the stop mode of the apparatus 10, the rotary arm 122 assumes a rotational position substantially along the guide groove 91 as shown in FIG. 1. A pin 124 which is engaged by the cam part 75 of the loading ring 71, is embeddedly provided at an intermediate part of the rotary arm 122.

Next, description will be given with respect to a tape loading operation and the like of the apparatus 10.

In the stop mode, the apparatus 10 assumes a state shown in FIGS. 1 and 3. In other words, the loading ring 71 assumes a rotational position rotated counterclockwise in FIG. 1 (clockwise in FIG. 3), and the loading poles 19, 20, and 22 and the guide pole 23 are positioned within the opening 28 of the tape cassette 25. Further, the poles 21 and 24 and the pinch roller 16 are also positioned within the opening 28 of the tape cassette 25. A tension arm 130 is rotated counterclockwise about a pin 131, together with a tension pole 132, and a brake band 133 provided with respect to the supply reel disc 17 is slackened.

When the apparatus 10 is operated so as to carry out a recording or a reproduction, the reel driving motor 42 and a loading motor 134 start to rotate, and the plunger 49 is activated.

When the plunger 49 is activated, an arm 135 rotates counterclockwise about a pin 136 in FIG. 1 (clockwise in FIG. 3). The idler pushing arm 47 and the brake release arm 62 are engaged by the arm 136, and are rotated clockwise in FIG. 1 (counterclockwise in FIG. 3). As the idler pushing arm 47 rotates, the idler 40 moves in the direction of the arrow $Y_2$, and pushes against the motor shaft 43 which is rotating in the direction of an arrow $E_1$. The plate 44 follows the above movement and rotates clockwise in FIG. 1 by the action of the spring 55, and the vertical wall 44a remains to push against the peripheral surface of the idler 40. Accordingly, as the idler 40 is rotated in the direction of an arrow $F_1$ by the rotating motor shaft 43, the idler 40 rolls over the vertical wall 44a and moves in the direction of the arrow $X_1$. In this state, the idler 40 pushes against the motor shaft 43 and the take-up reel disc 18 as shown in FIG. 2, and the take-up reel disc 18 is rotated in the direction of an arrow G, that is, in the tape take-up direction.

As the brake release arm 62 rotates, the brake lever 52 rotates clockwise in FIG. 1 while the brake lever 53 is engaged by the pin 60 and rotates counterclockwise in FIG. 1. As a result, the brake shoes 57 and 58 separate from the corresponding reel discs 17 and 18, and the braking with respect to both the reels 17 and 18 is released.

During a latter half of the rotation of the brake lever 53, the connecting plate 59 is pulled in the direction of the arrow $X_1$. Moreover, the plate 44 rotates counterclockwise in FIG. 1, and the vertical wall 44a separates from the peripheral surface of the idler 40.

The rotation of the loading motor 134 is transmitted to the loading gear 84 through a pulley 137, a belt 138, a pulley 139, a worm 140, a worm wheel 141, and gears 142 and 143. Hence, the loading gear 84 is rotated in the direction of an arrow $H_1$. As the loading gear 84 rotates, the gear part 73a of the loading ring mechanism 70 is first engaged by the loading gear 84, and the gear part 74 of the loading ring mechanism 70 is subsequently engaged by the loading gear 84. The tape loading operation is carried out in the following manner.

In an initial rotational stage of the loading ring mechanism 70, an L-shaped arm 150 on the lower surface of the chassis 11 follows the movement of a pin 151 which is located on the loading ring 71, and rotates clockwise about a pin 153 by the action of a spring 152, unitarily with the pin 153 as shown in FIGS. 3 and 4. At the same time, a small loading arm 154 which is fixed to the pin 153 and is provided on the supply reel side on the upper surface of the chassis 11, rotates counterclockwise in FIG. 1. Thus, the pole 21 intercepts a magnetic tape 155 and draws the magnetic tape 155 out of the tape cassette 25. In addition, as shown in FIGS. 3 and 4, a pin 157 of an arm 156 which is located on the lower surface of the chassis 11 is guided by the sloping portion 75c of the cam part 75, and the arm 156 is rotated clockwise about a pin 159 by the action of a spring 158. Following the rotation of the arm 156, a V-shaped arm 161 rotates counterclockwise about a pin 162 by the action of a spring 160, and a link 163 moves in the direction of the arrow $X_1$. An L-shaped arm 164 rotates clockwise about a pin 165, unitarily with the pin 165. As shown in FIG. 1, a gear 166 which is fixed to the upper part of the pin 165 on the upper surface of the chassis 11, rotates counterclockwise, unitarily with the arm 164. A gear 167 which is provided with an arm, rotates clockwise about a pin 168 up to a position where the gear 167 is stopped by a stopper 175. Therefore, the pole 24 intercepts and draws the magnetic tape 155 out of the tape cassette 25.

A tip end of the arm 156 is connected to one end of a link 169 which is located on the upper surface of the chassis 11, by a pin 171 which is loosely fitted within an arcuate hole 170 in the chassis 11. The other end of the link 169 is connected to a loading arm 173. The loading arm 173 is pivotally supported by a pin 172, and the sloping loading pole 22 is embeddedly provided at a tip end thereof. Accordingly, as the arm 156 rotates, the loading arm 173 rotates up to a final position where the loading arm 173 is stopped by a stopper 174 as shown in FIG. 2. In this state, the sloping loading pole 22 intercepts and draws the magnetic tape 155 out of the tape cassette 25. The initial stage of the tape loading operation is completed by the operations described heretofore. As indicated by a two-dot chain line in FIG. 1, the magnetic tape 155 is guided by the poles 21 and 24 in a tape path 155A. In the tape path 155A between the poles 21 and 24, the magnetic tape 155 is guided by the sloping loading pole 22, makes contact with a part of the peripheral surface of the guide drum 12, and successively makes contact with a tape guide member 176, the audio and control head 14, and a guide pole 177 as the magnetic tape 155 moves towards the pole 24 from the sloping loading pole 22. In other words, the tape path on the take-up reel side is completely formed in the initial stage of the tape loading operation. Therfore, as will be described later on in the specification, the operation of wrapping the magnetic tape 155 around the peripheral surface of the guide drum 12 by the loading poles 19 and 20 can be carried out without introducing a deviation in the position of the magnetic tape 155.

As the loading ring mechanism 70 undergoes a further rotation, the loading pole support 90 is pulled by the loading pole traction plate 72. Thus, the loading pole support 90 escapes from the branching groove part 91b and moves along the main groove part 91a. As the loading pole support 90 moves along the main groove part 91a, the loading poles 19 and 20 intercept and draw the magnetic tape 155 out of the tape cassette 25, so as to wrap the magnetic tape 155 around the peripheral surface of the guide drum 12.

As the rotation of the loading ring 71 progresses halfway, the sloping portion 75b of the cam part 75 makes contact with the pin 124, and the sloping portion 75b pushes the pin 124 in the direction of the arrow $X_2$. As a result, the arm 122 is rotated counterclockwise in FIG. 1 (clockwise in FIG. 3). Due to the rotation of the arm 122, the support base 110 moves in the direction of the arrow $X_2$ against the force exerted by the spring 116, and the full-width erasing head 13 moves to a position $C_2$ indicated by a two-dot chain line in FIG. 1. In the position $C_2$, the full-width erasing head 13 is receded from the moving path of the loading pole 19. The pin 124 is continuously guided by the arcuate portion 75a. Therefore, the arm 122 is maintained in the rotational position described above, and the full-width erasing head 13 is maintained in the receded position $C_2$.

In a stage where the loading ring 71 has rotated up to a position where the loading pole 19 has passed beyond the full-width erasing head 13, the pin 124 is guided by the sloping portion 75c. Hence, the arm 122 rotates clockwise in FIG. 1, and the full-width erasing head 13 moves in the direction of the arrow $X_1$ to return to the operating position $C_1$.

As shown in FIGS. 2 and 4, the window 75e rotates up to the final position where the window 75e opposes the light emitting element 85a and the light receiving element 86a, and the window 75e is detected by the light emitting element 85a and the light receiving element 86a.

In a final rotating stage of the loading ring 71, a lever 180 is engaged by the pin 77 and is rotated counterclockwise in FIG. 2 (clockwise in FIG. 4). The pinch roller 16 this pushes against the capstan 15, and the tension arm 130 assumes an operating state.

In other words, due to the rotation of the lever 180, a link 181 is pulled in the direction of the arrow $X_2$. As shown in FIG. 1, levers 182 and 183 which form a V-shape, respectively rotate so as to increase the angle of the V-shape. As a result, the levers 182 and 183 no longer form the V-shape but become substantially linear as shown in FIG. 2. A pinch roller support arm 184 rotates clockwise about the pin 168, against a force exerted by a spring 185. Hence, the pinch roller 16 escapes from the opening 28 in the tape cassette 25, and pushes against the capstan 15. In addition, an L-shaped lever 186 rotates counterclockwise against a strong force exerted by a spring 187, and separates from a stopper 188. The spring 187 applies the force for pushing the pinch roller 16 against the capstan 15.

Furthermore, due to the rotation of the lever 180, a link 189 is pushed in the direction of the arrow $X_2$, and a T-shaped arm 190 rotates against a force exerted by a spring 191, as shown in FIG. 4. Accordingly, a pin 192 of the tension arm 130 is released from the engagement with the arm 190, and the tension arm 130 is rotated clockwise by the action of a spring 193 as shown in FIG. 2. Thus, the brake band 133 becomes tense, and the tension pole 132 makes contact with the magnetic tape 155.

The vertical loading pole 19 is stopped by the stopper member 94. The loading ring 71 undergoes a further rotation while compressing the coil spring 79. The loading pole 19 is pushed against the stopper member 94 by the force which is accumulated in the compressed coil spring 79. Because the elongated hole 72b extends in the radial direction of the loading ring 71, the pulling force of the traction plate 72 acting on the loading pole support 90, will not be scattered at the elongated hole 72b. In other words, the pulling force of the traction plate 72 acts as the force which pushes the loading pole 19 against the stopper member 94. Hence, the force exerted by the coil spring 79 is effectively used to push the loading pole 19 against the stopper member 94. As shown in FIG. 8, the position of the loading pole 19 is stably restricted since the loading pole 19 is stopped by the upper and lower stoppers 94b and 94a at the two portions $B_1$ and $B_2$ which are more separated compared to the conventional case. The guide pole 23 moves along the main guide groove part 91a, and reaches a position shown in FIG. 2.

The tape loading operation is completed by the operations described heretofore, and the apparatus 10 assumes the state shown in FIGS. 2 and 4. In this state, the magnetic tape 155 forms a tape path 155B. In this tape path 155B, the magnetic tape 155 is drawn outside the tape cassette 25 from the supply reel 26, and is successively guided by the tape draw-out pole 21, the tension pole 132, and the guide pole 23. Further, the magnetic tape 155 makes contact with the full-width erasing head 13, and is guided by the vertical loading pole 19. The magnetic tape 155 is then spirally wrapped around the peripheral surface of the guide drum 12 over a predetermined angular range which is determined by the sloping loading poles 20 and 22. Thereafter, the magnetic tape 155 is guided by the tape guide member 176, the guide pole 177, and the tape draw-out pole 24, and finally enters within the tape cassette 25 to be taken up by the take-up reel 27.

The magnetic tape 155 between the full-width erasing head 13 and the tension pole 132, is guided by the guide pole 23 so as to form a tape path which is separated from the peripheral surface of the guide drum 12.

The magnetic tape 155 which separates from the peripheral surface of the guide drum 12, is guided by the sloping loading pole 22 and is corrected of its position so that the surface of the magnetic tape 155 becomes vertical to the chassis 11. The magnetic tape 155 which has been corrected of its position, is then corrected of its height position by the tape guide member 176 which is adjacent to the sloping loading pole 22, so that the magnetic tape 155 assumes a height position which is higher than the chassis 11. The tape guiding surface of the tape guide member 176 is smooth, and is substantially arcuate in the moving direction of the magnetic tape 155.

The movement of the magnetic tape 155 is stabilized as the magnetic tape 155 slides over the tape guiding surface of the tape guide member 176. Accordingly, the movement of the magnetic tape 155 is stabilized before it reaches the audio and control head 14.

A capstan motor 195 rotates a flywheel 197 through a belt 196, and the capstan 15 rotates unitarily with the flywheel 197. The magnetic tape 155 is driven in a state where it is pinched between the pinch roller 16 and the capstan 15, and moves in the forward direction along the tape path 155B. A video signal is recorded on or reproduced from the magnetic tape 155 by one or a plurality of video heads as the magnetic tape 155 moves and makes contact with the peripheral surface of the guide drum 12.

During an insert recording mode, the apparatus 11 inserts and records a new information on a pre-recorded magnetic tape. Because the full-width erasing head 13 is located near the guide drum 12 along the tape path, a tape portion which has been erased by the full-width erasing head 13 during such an insert recording mode will reach the guide drum 12 within a short period of time. For this reason, a waiting time between the time when the apparatus 10 is operated to carry out the insert recording and the time when the insert recording is actually carried out, becomes short compared to the conventional case, and the actual insert recording can be started quickly.

The magnetic tape 155 is guided at the exit side and the entrance side of the tape cassette 25 by the vertical tape draw-out poles 21 and 24, separated from tape guide parts 198 and 199 of the tape cassette 25. Hence, the magnetic tape 155 is guided so that its surface is accurately perpendicular to the chassis 11 under the guidance of the vertical tape draw-out poles 21 and 24, regardless of the precision with which the tape cassette 25 is manufactured, and even when the lower surface of the loaded tape cassette 25 is not perfectly parallel to the chassis 11. Therefore, the magnetic tape 155 stably moves along the tape path outside the tape cassette 25.

During the operation in which the magnetic tape 155 is wrapped around the peripheral surface of the guide drum 12 over a large angle by the loading poles 19 and 20, the tension in the magnetic tape 155 at a portion thereof which is in engagement with the sloping loading pole 20 becomes unbalanced in the width direction of the magnetic tape 155. Thus, a force acts on the magnetic tape 155 so as to slide the magnetic tape 155 toward the top of the sloping loading pole 20. Therefore, unless a special measure is taken to prevent such an unwanted sliding of the magnetic tape 155 towards the top of the sloping loading pole 20, the entrance side of the tape path in contact with the peripheral surface of the guide drum 12 becomes upwardly deviated when the tape loading operation is completed. This deviated tape path will gradually be corrected to the regular tape path as the magnetic tape 155 moves, however, it takes a couple of seconds until the tape path is returned to the regular tape path. Until the magnetic tape 155 moves in the regular tape path, the recording and reproduction cannot be carried out in the normal manner, and the start of the actual recording and reproduction are accordingly delayed. Further, the unwanted sliding of the magnetic tape 155 toward the top of the sloping loading pole 20 sometimes damages the magnetic tape 155 by causing wrinkles in the magnetic tape 155, for example.

Accordingly, in the present embodiment, the apparatus 10 is designed to complete the tape path on the take-up reel side in the initial stage of the tape loading operation. The operation in which the magnetic tape 155 is wrapped around the peripheral surface of the guide drum 12 by the sloping loading pole 20, is carried out in this state where the tape path on the take-up reel side has been completed.

In the state where the sloping loading pole 22 has completed the operation of wrapping the magnetic tape 155 around the peripheral surface of the guide drum 12, the magnetic tape 155 is guided by the sloping guide pole 22 in a state where the tension is uniform in the width direction of the magnetic tape 155, because the distance over which the magnetic tape 155 is moved so as to be wrapped around the peripheral surface of the guide drum 12 is short. Thus, the magnetic tape 155 which is guided by the sloping loading pole 22, does not receive a force which tends to slide the magnetic tape 155 along the sloping loading pole 22. In other words, the sloping loading pole 22 is designed so that the magnetic tape 155 is prevented from sliding along the sloping loading pole 22. Furthermore, the magnetic tape 155 makes contact with the tape guide member 176, in a state where the upper and lower edges of the magnetic tape are respectively guided by upper and lower flanges 176a and 176b. Accordingly, the height position of the magnetic tape 155 is restricted by the tape guide member 176. Consequently, at the exit side of the tape path in contact with the peripheral surface of the guide drum 12, the magnetic tape 155 is guided by the sloping loading pole 22 and the tape guide member 176, and is restricted of its height position. Hence, the height position of the magnetic tape 155 at a portion thereof which is intercepted by the sloping loading pole 20, is not easily deviated. Therefore, the magnetic tape 155 is wrapped around the peripheral surface of the guide drum 12 without deviating along the vertical loading pole 19, and in the state where the tape loading operation is completed, the magnetic tape 155 is loaded in the regular tape path at the correct height position. Accordingly, it is possible to immediately start the recording or reproduction from this state, in a normal manner.

The tape guide member 176 is wide in the moving direction of the magnetic tape 155. The tape guide member 176 comprises the upper and lower flanges 176a and 176b described before, and is mounted perpendicular to the chassis 11. The position of the magnetic tape 155 is positively restricted, because the upper and lower edges of the magnetic tape 155 are guided by the upper and lower flanges 176a and 176b over a relatively long distance. As a result, the positional deviation of the magnetic tape 155 along the sloping loading pole 20 is more positively prevented.

Accordingly, a large part of the tape loading operation in which the magnetic tape 155 is wrapped around the peripheral surface of the guide drum 12, is carried out by the supply side loading pole 19 (20) which moves over a long distance, and the remaining part of the tape loading operation is carried out by the take-up side loading pole 22 which moves over an extremely short distance. For this reason, it is unnecessary to provide a loading ring for moving the take-up side loading pole 22, and only the loading arm 173 is required. Thus, the thickness and weight of the apparatus 10 can be reduced. When the distance over which the take-up side loading pole 22 must move is short, there is an additional advantage. That is, even in a case where the tape loading operation is carried out in a state where the tape roll remaining on the take-up reel 27 is small, the possibility of the magnetic tape 155 being drawn out to the end of the magnetic tape 155 and being forcibly stretched is small.

When a pause operation is carried out during a recording or reproducing mode of the apparatus 10, or when a search operation is carried out during a reproducing mode of the apparatus 10, the loading ring 71 rotates slightly in the direction of the arrow $A_2$ up to a position where the window 75e is detected by the combination of the light emitting element 85b and the light receiving element 86b. Hence, the lever 180 slightly rotates counterclockwise in FIG. 4 and the pinch roller 16 separates from the capstan 15, and the tension pole 132 separates from the magnetic tape 155.

Further, when a stop operation is carried out during a recording or reproducing mode of the apparatus 10, the loading motor 134 starts to rotate in the reverse direction, and the loading ring mechanism 70 rotates in the direction of the arrow $A_2$ up to the position shown in FIGS. 1 and 3. The members which carried out the tape loading operation respectively move in a sequence and direction opposite to those at the time of the tape loading operation, so as to carry out a tape unloading operation.

The pin 124 is guided by the sloping portion 75c of the cam part 75 of the loading ring 71, and the rotary arm 122 rotates counterclockwise in FIG. 2. As a result, the full-width erasing head 13 moves in the direction of the arrow $X_2$ and recedes. The full-width erasing head 13 recedes in a direction which is approximately the same as a direction tangential to an arcuate moving locus of the loading pole 19 at an initial stage of the tape unloading operation. For this reason, compared to a case where the full-width erasing head 13 is designed to recede in a direction approximately perpendicular to the moving locus of the loading pole 19, the full-width erasing head 13 may take a longer time to completely recede from the time when the tape unloading operation is started. The sloping portion 75c of the cam part 75, slopes gradually. Therefore, the operation in which the full-width erasing head 13 is moved in the direction of the arrow $X_2$ can be carried out smoothly, without introducing a sudden increase in the load on the loading motor 134.

When the loading pole support 90 is pushed by the loading pole traction plate 72 and returns by passing the position indicated by the two-dot chain line in FIG. 2, the pin 100 is guided by the guide plate 97. The loading pole support 90 is guided by the guide plate 98 and the guide pin 99, and changes the moving direction so as to enter within branching guide groove part 91b. The elongated hole 72b in the loading pole traction plate 72 acts so that the loading pole support 90 is mainly pushed toward the main guide groove part 91a, and the force which pushes the loading pole support 90 toward the branching guide groove part 91b is small. However, the loading pole support 90 positively enters within the branching guide groove part 91b under the guidance of the guide plates 97 and 98. As the loading pole support 90 enters within the branching guide groove part 91b, the loading poles 19 and 20 and the guide pole 23 become arranged as shown in FIG. 1.

When the loading ring mechanism 70 returns to the original position, the plunger 49 is turned OFF. As a result, the idler 40 is returned to the center position by the action of the spring 50 as shown in FIG. 1. Moreover, the brake shoes 57 and 58 push against the respective reel discs 17 and 18 so as to brake these reel discs 17 and 18.

In addition, when a fast-forward operation is carried out during a stop mode of the apparatus 10, the idler 40 moves to the position shown in FIG. 2 as in the case described before. On the other hand, when a rewind operation is carried out during a stop mode of the apparatus 10, the plunger 49 is turned ON, and the reel driving motor 42 starts to rotate in the direction of the arrow $E_2$. Consequently, the idler 40 moves to a position so as to push against the supply reel disc 17.

When a cassette ejecting operation is carried out during a stop mode of the apparatus 10, the loading motor 134 rotates in the same direction as in the case of the tape unloading operation described before, and the loading gear 84 rotates in the direction of an arrow $H_2$. In this state, the loading gear 84 opposes the cutout part 76 of the loading ring 71 and meshes with the gear part 73a of the cassette ejecting plate 73. Accordingly, the loading ring 13 does not rotate, and the cassette ejecting plate 73 rotates in the direction of the arrow $A_2$ against the action of the spring 81, independently of the loading ring 71. Due to this independent rotation of the cassette ejecting plate 73, the ejecting arm 200 is engaged by the pin 83 on the cassette ejecting plate 73 and is rotated counterclockwise as shown in FIG. 3. A lever 202 rotates clockwise, and a link 203 is pulled in the direction of the arrow $X_1$. An L-shaped lever 204 rotates counterclockwise, and an ejecting lever 205 moves in the direction of the arrow $Y_1$ against the action of a spring 206. As the ejecting lever 105 moves, the hanging arm 36 is engaged and rotates clockwise in FIG. 5 against the action of a spring 207. The pin 37 thus escapes from the claw part 31a, and the housing 31 is released from the locked state. As a result, the housing 31 is raised by the action of the spring 35, and the tape cassette 25 is ejected from the loading part thereof.

After the cassette ejecting operation is completed, the gear 84 rotates in the direction of the arrow $H_1$, and the cassette ejecting plate 73 returns to its original position.

Further, the present invention is not limited to these embodiments, but various variations and modifications may be made without departing from the scope of the present invention.

What is claimed is:

1. An automatic tape loading type recording and/or reproducing apparatus comprising:
    a guide drum having one or a plurality of recording and/or reproducing heads for recording and/or reproducing a signal on and/or from a tape;
    first and second loading members which relatively enter within a tape cassette which is loaded into said apparatus;
    first loading meand for moving said first loading member over a predetermined distance so as to perform a first tape wrapping operation in which said first loading member draws said tape out of the loaded tape cassette and wraps said tape around a peripheral surface of said guide drum;
    second loading means comprising a rotatable loading ring which is disposed to encircle said guide drum, said rotatable loading ring rotating to move said second loading member along the peripheral surface of said guide drum in a direction opposite to the moving direction of said first loading member so as to perform a second tape wrapping operation in which said second loading member draws said tape out of said loaded tape cassette and wraps said tape around the peripheral surface of said guide drum; and
    control means comprising a cam part provided on said rotatable loading ring and arm means for operating said first loading means when said loading ring rotates so that said first loading means moves said first loading member, said first loading member completing said first tape wrapping operation while said arm means is in contact with said cam part, said cam part being located on said rotatable loading ring at such a position that said first tape wrapping operation is completed in an initial operating stage of said second tape wrapping operation, with said second tape wrapping operation being completed subsequent to completion of said first tape wrapping operation.

2. A recording and/or reproducing apparatus as claimed in claim 1 in which said first loading means comprises a rotatable arm member having said first loading member at a tip end thereof, and a spring member for rotating said arm member.

3. A recording and/or reproducing apparatus as claimed in claim 1 in which said first loading member comprises a loading pole, said apparatus further comprises a tape guide member for restricting a deviation of said tape in a width direction thereof and for guiding said tape, and said tape guide member is disposed in a vicinity of said loading pole which has completed the first tape wrapping operation.

4. A recording and/or reproducing apparatus as claimed in claim 1 which further comprises a full-width erasing head which makes contact with said tape on an upstream side with respect to said guide drum in a moving direction of said tape, and receding means for causing said full-width erasing head to recede so as not to interfere with the movement of said second loading member, said receding means moving said full-width erasing head approximately tangential to a moving locus of said second loading member in a direction which is the same as a moving direction of said second loading member, responsive to an operation of said second loading means at the time of a tape unloading operation.

5. A recording and/or reproducing apparatus as claimed in claim 4 in which said receding means comprises said cam part of said loading ring, and a rotatable arm member which has a tip end thereof coupled to said full-width erasing head and is engaged and rotated by said cam part, and said full-width erasing head is caused to recede by the rotation of said rotatable arm member.

6. A recording and/or reproducing apparatus as claimed in claim 5 in which said receding means further comprises a guide mechanism for guiding said full-width erasing head approximately tangential to the moving locus of said second loading member, and said full-width erasing head is caused to recede under guidance of said guide mechanism responsive to the rotation of said rotatable arm member.

* * * * *